(12) United States Patent
Wu (10) Patent No.: US 10,944,716 B2
(45) Date of Patent: Mar. 9, 2021

(54) METERING DEVICE ADDRESS MANAGEMENT METHOD, COLLECTION TERMINAL, AND METERING DEVICE

(71) Applicant: HUAWEI TECHNOLOGIES CO., LTD., Shenzhen (CN)

(72) Inventor: Yifan Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 16/132,457

(22) Filed: Sep. 16, 2018

(65) Prior Publication Data

US 2019/0020621 A1 Jan. 17, 2019

Related U.S. Application Data

(63) Continuation of application No. PCT/CN2016/110466, filed on Dec. 16, 2016.

(30) Foreign Application Priority Data

Mar. 17, 2016 (CN) .......................... 201610152627.8

(51) Int. Cl.
*G06F 15/16* (2006.01)
*H04L 29/12* (2006.01)
(Continued)

(52) U.S. Cl.
CPC ........ *H04L 61/2046* (2013.01); *H04L 5/0055* (2013.01); *H04L 29/02* (2013.01);
(Continued)

(58) Field of Classification Search
CPC .... H04L 61/2046; H04L 29/02; H04L 67/125
See application file for complete search history.

(56) References Cited

U.S. PATENT DOCUMENTS 7,486,495 B1* 2/2009 Diederichs ......... G05B 19/4185
340/870.07
2003/0035387 A1* 2/2003 Kim .................... H04L 61/1511
370/328
(Continued)

FOREIGN PATENT DOCUMENTS

CN 1458799 A 11/2003
CN 1547366 A 11/2004
(Continued)

OTHER PUBLICATIONS

Suxue Guo et al.,"Graphical SCM programming and application",dated Jan. 2013,total 12 pages.

*Primary Examiner* — Douglas B Blair
(74) *Attorney, Agent, or Firm* — Kilpatrick Townsend & Stockton LLP (57) ABSTRACT

A metering device address management method performed by a collection terminal, includes: sending a first signal to a target metering device to instruct the target metering device to respond to an address protocol packet, and sending a second signal to remaining metering devices that are other than the target metering device and that are connected to the collection terminal to instruct the remaining metering devices not to respond to the address protocol packet; and broadcasting the address protocol packet, where the address protocol packet is used to query or set a physical address of the target metering device. Then the target metering device responds, according to the first signal, to the address protocol packet broadcast. Therefore, the collection terminal can automatically set and query the physical address of the metering device, to resolve a problem of manually configuring the physical address of the metering device.

8 Claims, 5 Drawing Sheets

(51) Int. Cl.
*H04L 29/02* (2006.01)
*H04L 29/08* (2006.01)
*H04L 5/00* (2006.01)

(52) U.S. Cl.
CPC ........ *H04L 61/103* (2013.01); *H04L 61/2038* (2013.01); *H04L 61/6022* (2013.01); *H04L 67/12* (2013.01); *H04L 67/125* (2013.01)

(56) References Cited

U.S. PATENT DOCUMENTS

| | | |
|---|---|---|
| 2004/0128084 A1 | 7/2004 | Keech |
| 2012/0239206 A1* | 9/2012 | Sauer ................ H04L 61/6095 700/276 |
| 2013/0089092 A1 | 4/2013 | Dai et al. |
| 2014/0376359 A1 | 12/2014 | Nishikata et al. |
| 2015/0052231 A1* | 2/2015 | Sun .................... H04L 41/0803 709/223 |
| 2015/0227482 A1* | 8/2015 | Winter ................ G06F 13/4234 710/117 |
| 2016/0092388 A1* | 3/2016 | Sorenson ............ G06F 13/4068 710/110 |
| 2019/0124048 A1* | 4/2019 | Lemon ................ H04L 63/105 |

FOREIGN PATENT DOCUMENTS

| | | |
|---|---|---|
| CN | 1674593 A | 9/2005 |
| CN | 101969429 A | 2/2011 |
| CN | 102246495 A | 11/2011 |
| CN | 103680108 A | 3/2014 |
| EP | 2063602 A2 | 5/2009 |
| WO | 2009013762 A1 | 1/2009 |
| WO | 2014007604 A1 | 1/2014 |

* cited by examiner

METERING DEVICE ADDRESS MANAGEMENT METHOD, COLLECTION TERMINAL, AND METERING DEVICE

CROSS-REFERENCE TO RELATED APPLICATIONS

This application is a continuation of International Application No. PCT/CN2016/110466, filed on Dec. 16, 2016, which claims priority to Chinese Patent Application No. 201610152627.8, filed on Mar. 17, 2016. The disclosures of the aforementioned applications are hereby incorporated by reference in their entireties.

TECHNICAL FIELD

Embodiments of the present invention relate to the communications field, and specifically, to a metering device address management method, a collection terminal, and a metering device.

BACKGROUND

In an advanced metering infrastructure (Advanced Metering Infrastructure, AMI for short) system, a collection terminal and a meter may be connected to each other by using a Recommended Standard (Recommended Standard, RS for short)-485 bus, and the collection terminal and the meter may transmit data to each other based on the International Electrotechnical Commission (International Electro technical Commission, IEC for short) 62056 protocols. A link layer protocol applicable to the RS-485 bus is the IEC62056-21 protocol.

The RS-485 bus is a half-duplex shared medium. Therefore, when one meter sends data, another meter on the bus cannot send data. In addition, the data sent by the meter may be received by all meters on the bus. Each meter on the bus needs to have a unique physical address. A physical address range of a meter defined by the IEC62056-21 protocol is 0x001-0x1FF. After receiving a packet sent by the collection terminal, each meter needs to confirm whether a destination address of the packet is an address of the meter, and then performs corresponding processing.

When addresses on one bus conflict, the addresses of meters whose addresses conflict with each other are usually set manually, so as to resolve an address conflict problem. Consequently, on-site operation difficulty and manpower costs increase.

SUMMARY

This application provides a metering device address management method, a collection terminal, and a metering device, so that the collection terminal can automatically query and set a physical address of a metering device.

According to a first aspect, a metering device address management method is provided, where the method includes: sending, by a collection terminal, a first signal to a target metering device, and sending a second signal to remaining metering devices that are other than the target metering device and that are connected to the collection terminal, where the first signal instructs the target metering device to respond to an address protocol packet sent by the collection terminal, and the second signal instructs the remaining metering devices not to respond to the address protocol packet; and broadcasting, by the collection terminal, the address protocol packet, where the address protocol packet is used to query or set a physical address of the target metering device. In this way, the collection terminal sends the first signal to the target metering device, and sends the second signal to the remaining metering devices that are other than the target metering device and that are connected to the collection terminal, so that the target metering device can respond to the address protocol packet broadcast by the collection terminal, and the remaining metering devices connected to the collection terminal do not respond to the address protocol packet. Therefore, the collection terminal can automatically query and set the physical address of the metering device, so that a problem of manually configuring the physical address of the metering device is resolved.

With reference to the first aspect, in a first possible implementation of the first aspect, before the sending, by a collection terminal, a first signal to a target metering device, the method may further include: receiving, by the collection terminal, a third signal sent by the target metering device, where the third signal indicates that the target metering device is connected to the collection terminal.

With reference to the foregoing possible implementation of the first aspect, in a second possible implementation of the first aspect, the address protocol packet includes a target physical address, where the target physical address is corresponding to the target metering device.

With reference to the foregoing possible implementations of the first aspect, in a third possible implementation of the first aspect, the method may further include: receiving, by the collection terminal, an acknowledgement (Acknowledgement, ACK for short) message sent by the target metering device, where the ACK message is sent by the target metering device after the target metering device sets the physical address of the target metering device to the target physical address according to the address protocol packet.

According to a second aspect, a metering device address management method is provided, where the method includes: receiving, by a metering device, a first signal sent by a collection terminal; receiving, by the metering device, an address protocol packet sent by the collection terminal, where the address protocol packet is used to query or set a physical address of the metering device; and performing, by the metering device, response processing on the address protocol packet according to the first signal.

According to the metering device address management method in an embodiment of the present invention, the metering device performs, according to the first signal sent by the collection terminal, response processing on the address protocol packet broadcast by the collection terminal. Therefore, the collection terminal can automatically query and set the physical address of the metering device, so that a problem of manually configuring the physical address of the metering device is resolved.

With reference to the second aspect, in a first possible implementation of the second aspect, before the receiving, by a metering device, a first signal sent by a collection terminal, the method may further include: sending, by the metering device, a third signal to the collection terminal, where the third signal indicates that the metering device is connected to the collection terminal.

With reference to the foregoing possible implementation of the second aspect, in a second possible implementation of the second aspect, the address protocol packet includes a target physical address; and the performing, by the metering device, response processing on the address protocol packet according to the first signal includes: setting, by the metering device, the physical address of the metering device to the target physical address according to the first signal.

With reference to the foregoing possible implementations of the second aspect, in a third possible implementation of the second aspect, the method may further include: sending, by the metering device, an ACK message to the collection terminal.

According to a third aspect, a collection terminal is provided, where the collection terminal includes: a sending unit, configured to: send a first signal to a target metering device; and send a second signal to remaining metering devices that are other than the target metering device and that are connected to the collection terminal, where the first signal instructs the target metering device to respond to an address protocol packet sent by the collection terminal, and the second signal instructs the remaining metering devices not to respond to the address protocol packet, where the sending unit is further configured to broadcast the address protocol packet, where the address protocol packet is used to query or set a physical address of the target metering device.

The collection terminal in an embodiment of the present invention sends the first signal to the target metering device, and sends the second signal to the remaining metering devices that are other than the target metering device and that are connected to the collection terminal, so that the target metering device can respond to the address protocol packet broadcast by the collection terminal, and the remaining metering devices connected to the collection terminal do not respond to the address protocol packet. Therefore, the collection terminal can automatically query and set the physical address of the metering device, so that a problem of manually configuring the physical address of the metering device is resolved.

The collection terminal in the third aspect may include the units configured to perform the method in the first aspect or any possible implementation of the first aspect.

According to a fourth aspect, a metering device is provided, where the metering device includes: a receiving unit, configured to receive a first signal sent by a collection terminal, where the receiving unit is further configured to receive an address protocol packet sent by the collection terminal, where the address protocol packet is used to query or set a physical address of the metering device; and a processing unit, configured to perform response processing on the address protocol packet according to the first signal received by the receiving unit.

The metering device in an embodiment of the present invention performs, according to the first signal sent by the collection terminal, response processing on the address protocol packet broadcast by the collection terminal. Therefore, the collection terminal can automatically query and set the physical address of the metering device, so that a problem of manually configuring the physical address of the metering device is resolved.

The metering device in the fourth aspect may include the units configured to perform the method in the second aspect or any possible implementation of the second aspect.

According to a fifth aspect, a collection terminal is provided, including a communications interface, a processor, a memory, and a bus system. The communications interface, the memory, and the processor are connected by using the bus system. The memory is configured to store an instruction. The processor is configured to execute the instruction stored in the memory, so as to control the communications interface to receive or send a signal. In addition, when the processor executes the instruction stored in the memory, the processor can perform the method in the first aspect or any possible implementation of the first aspect.

According to a sixth aspect, a metering device is provided, including a communications interface, a processor, a memory, and a bus system. The communications interface, the memory, and the processor are connected by using the bus system. The memory is configured to store an instruction. The processor is configured to execute the instruction stored in the memory, so as to control the communications interface to receive or send a signal. In addition, when the processor executes the instruction stored in the memory, the processor can perform the method in the second aspect or any possible implementation of the second aspect.

According to a seventh aspect, a computer readable medium is provided and is configured to store a computer program. The computer program includes an instruction used to perform the method in the first aspect or any possible implementation of the first aspect.

According to an eighth aspect, a computer readable medium is provided and is configured to store a computer program. The computer program includes an instruction used to perform the method in the second aspect or any possible implementation of the second aspect.

DESCRIPTION OF EMBODIMENTS

The following describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Figure 1:
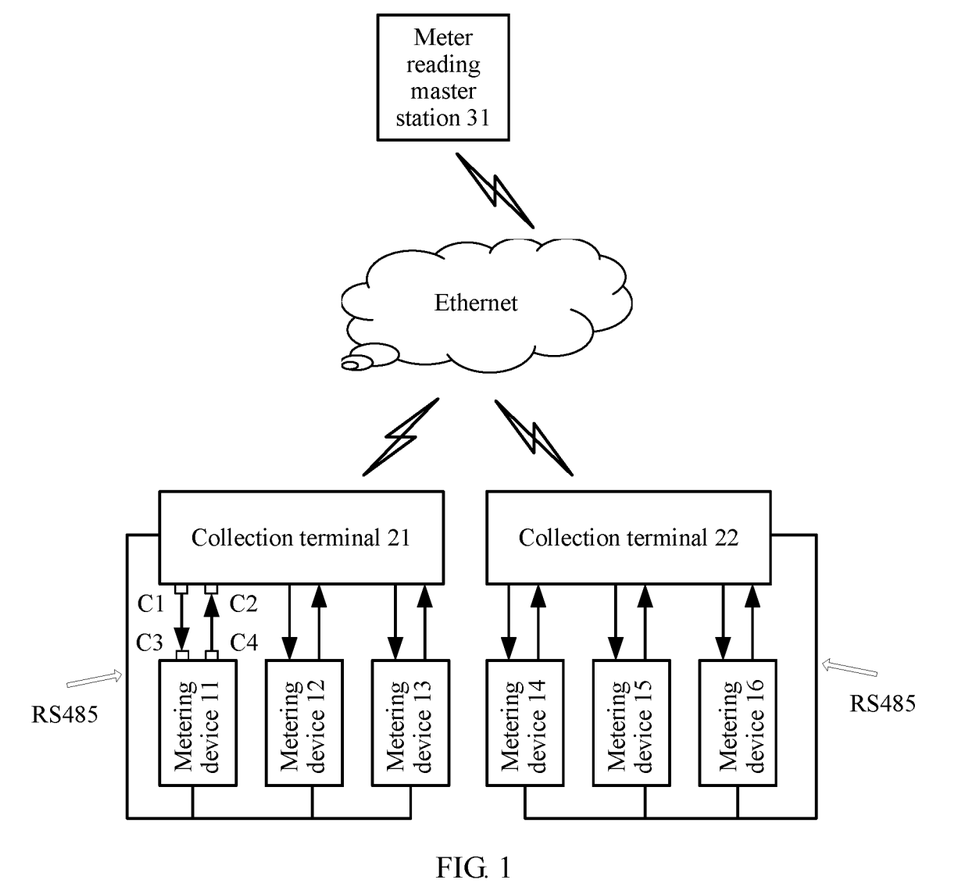
FIG. 1 is a schematic block diagram of a meter reading system according to an embodiment of the present invention.

The technical solution in this embodiment of the present invention may be applied to a meter reading system, for example, a meter reading system deployed by using an AMI shown in FIG. 1. As shown in FIG. 1, the system includes a master station 31, a collection terminal 21, a collection terminal 22, and metering devices 11 to 16. In the meter reading system, the intelligent metering terminals (the metering devices 11 to 16) collect data, transmit the collected data to the collection terminal 21 or the collection terminal 22 by using an RS-485 bus, and finally transmit the data to the meter reading master station 31 by using Ethernet.

Specifically, in the system, an intelligent metering terminal may be a smart meter, a smart water meter, or the like. The collection terminal such as the collection terminal 21 may be a collector or a concentrator. The collector is mainly responsible for collecting data of the intelligent metering terminal. The concentrator is mainly responsible for collecting statistics about and storing the data collected by the collector, and is responsible for setting, storage, and data transformation of system parameters, remote connectivity control, and the like. In some applications, the concentrator may also have a function of collecting data. The master station 31 may maintain and manage the collected data, and set various running parameters of the intelligent metering terminal or the collection terminal.

In this embodiment of the present invention, an example in which the collection terminal is the concentrator is used to describe the technical solution. When the collection terminal is the concentrator, the concentrator may indirectly communicate with a metering device by using the collector. Certainly, a concentrator having the function of collecting data may directly communicate with the metering device. Specifically, in this embodiment of the present invention, an example in which the concentrator directly communicates with the metering device is used for description. However, this is not limited in the present invention. For example, the concentrator indirectly communicates with the metering device by means of forwarding of the collector, and this also falls within the protection scope of the present invention.

In the system shown in FIG. 1, the collection terminal may communicate with the intelligent metering terminal by using the RS-485 bus. When the collection terminal collects data of the intelligent metering terminal, for example, when the collection terminal 21 collects data of the metering device 11, the collection terminal 21 broadcasts an information collection packet, where the information collection packet includes a physical address of the metering device 11. All of the metering devices 11 to 13 on the RS-485 bus receive the information collection packet. Each metering device compares the physical address in the information collection packet with a physical address of the metering device. The metering device 11 detects that the information collection packet is to be sent to the metering device 11, and therefore the metering device 11 performs a related operation according to the information collection packet, including data collection, and the like. After completing the data collection, the metering device 11 sends collected data to the collection terminal 21. After receiving the collected data, the collection terminal 21 may continue to send a next instruction. In contrast, the metering devices 12 and 13 directly discard the information collection packet, and waits for the next instruction of the collection terminal 21.

However, if a physical address of any one of the metering devices 12 and 13 conflicts with the physical address of the metering device 11, the metering device 11 may not be capable of collecting data. To resolve the foregoing technical problem, in this embodiment of the present invention, two control pins shown in FIG. 1 are defined in the collection terminal, that is, an address response pin C1 and a device in-position pin C2. A pin C3 corresponding to the pin C1 and a pin C4 corresponding to the pin C2 are defined in the metering device. In addition, the collection terminal manages, by using a physical path different from the RS-485 bus, a signal output by the pin C1 of the collection terminal, that is, a signal (denoted as a CS) input to the pin C3 of the metering device, and a signal input to the pin C2 of the collection terminal, that is, a signal (denoted as an OL) output by the pin C4 of the metering device. In this out-of-band control manner, that is, the metering device is correspondingly controlled according to the signal (the CS) output by the control pin C1 and the signal (the OL) input to the pin C2, the collection terminal can be controlled to automatically set a physical address of a metering device even if the collection terminal does not learn the physical address of the metering device. Therefore, there is no need to manually configure the physical address of the metering device in the field. The following details a specific operation of automatically configuring the physical address of the metering device in this embodiment of the present invention with reference to FIG. 2 to FIG. 4.

It should be understood that names of the foregoing pins and the corresponding input or output signal are only for ease of description. Apparently, a person skilled in the art can modify the names of the foregoing pins and the corresponding input or output signal. Such modifications also fall within the scope of this embodiment of the present invention.

It should be understood that FIG. 1 is merely a specific application scenario of the present invention, and this embodiment of the present invention may also be applied to another meter reading system, for example, a meter reading system in which the collection terminal communicates with the meter reading master station by using a wireless network. This is not limited in the present invention. In addition, FIG. 1 only shows an example of a pin newly defined between the metering device 11 and the collection terminal 21. Apparently, a person skilled in the art can understand that there is a corresponding pin between another metering device and the collection terminal.

Figure 2:
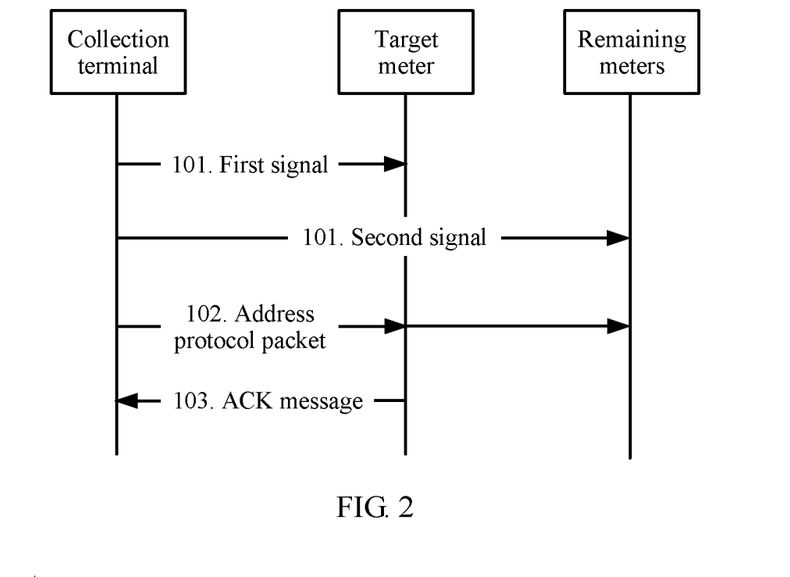
FIG. 2 is a schematic flowchart of a metering device address management method according to an embodiment of the present invention.

FIG. 2 is a schematic flowchart of a metering device address management method according to an embodiment of the present invention. This method mainly relates to communication between a collection terminal and a metering device. In this application, an example in which the metering device is a smart meter (a meter for short below) is used to describe this embodiment of the present invention in detail. However, this is not limited in the present invention.

101. The collection terminal sends a first signal to a target meter, and sends a second signal to remaining meters that are other than the target meter and that are connected to the collection terminal.

The target meter is a meter whose physical address needs to be queried or set by the collection terminal. The first signal is used to instruct the target meter to respond to an address protocol packet broadcast by the collection terminal. That is, the target meter queries or sets the physical address of the target meter according to the address protocol packet. The second signal is used to instruct the remaining meters not to respond to the address protocol packet after the remaining meters receive the address protocol packet. The remaining meters may directly discard the address protocol packet. That is, only the meter that receives the first signal can respond to the address protocol packet.

It should be noted that only one meter receives the first signal at one moment. In addition, the meter that receives the first signal, that is, the target meter, can respond to the address protocol packet only when all the remaining meters receive the second signal.

In this embodiment of the present invention, the collection terminal does not need to learn a physical address of a meter when setting a CS of the meter. Specifically, the collection terminal may set a CS of the target meter to a low electrical level, that is, the first signal, and set a CS corresponding to the remaining meters to a high electrical level, that is, the second signal. Alternatively, the collection terminal may set a CS of the target meter to a high electrical level, that is, the first signal, and set a CS of the remaining meters to a low electrical level, that is, the second signal. The target meter whose CS is set to the first signal may respond to the address protocol packet broadcast by the collection terminal. That is, after receiving the address protocol packet, the target meter may respond to a physical address query request or a physical address set command of the collection terminal according to specific content of the address protocol packet. However, the remaining meters whose CS is set to the second signal directly discard the address protocol packet. In this way, the collection terminal can automatically query or set a meter address.

102. The collection terminal broadcasts an address protocol packet, where the address protocol packet is used to query or set a physical address of the target meter.

After setting the CS of the meter, the collection terminal may broadcast the address protocol packet, to set or query the physical address of the target meter.

Optionally, the address protocol packet may include a target physical address, where the target physical address is corresponding to the target meter.

Specifically, the collection terminal may allocate the physical address of the target meter, and notify, by broadcasting the address protocol packet, the target meter of the physical address allocated by the collection terminal, that is, the target physical address. After receiving the address protocol packet, the target meter determines that the CS is the first signal; and when the CS of the remaining meters connected to the collection terminal is the second signal, the target meter may set the physical address of the target meter to the target physical address. Then, when the collection terminal communicates with the target meter, an address used to identify the target meter is the target physical address.

According to the metering device address management method in this embodiment of the present invention, the first signal is sent to the target metering device, and the second signal is sent to the remaining metering devices that are other than the target metering device and that are connected to the collection terminal, so that the target metering device can respond to the address protocol packet broadcast by the collection terminal, and the remaining metering devices connected to the collection terminal do not respond to the address protocol packet. Therefore, the collection terminal can automatically query and set the physical address of the metering device, so that a problem of manually configuring the physical address of the metering device is resolved.

Optionally, the method may further include: 103. The collection terminal receives an ACK message sent by the target meter. The ACK message is sent by the target meter after the target meter sets the physical address of the target meter to the target physical address according to the address protocol packet.

After receiving the address protocol packet and setting the physical address of the target meter according to the packet, the target meter may send the ACK message to the collection terminal. In this way, the collection terminal may learn that a current physical address of the target meter is the target physical address. Then, when the collection terminal communicates with the target meter, the collection terminal may use the target physical address.

In addition, the target meter may not reply with the ACK message. In this case, the collection terminal considers by default that the target meter correctly receives the address protocol packet, and that the target meter sets the physical address of the target meter to the target physical address.

Figure 3:
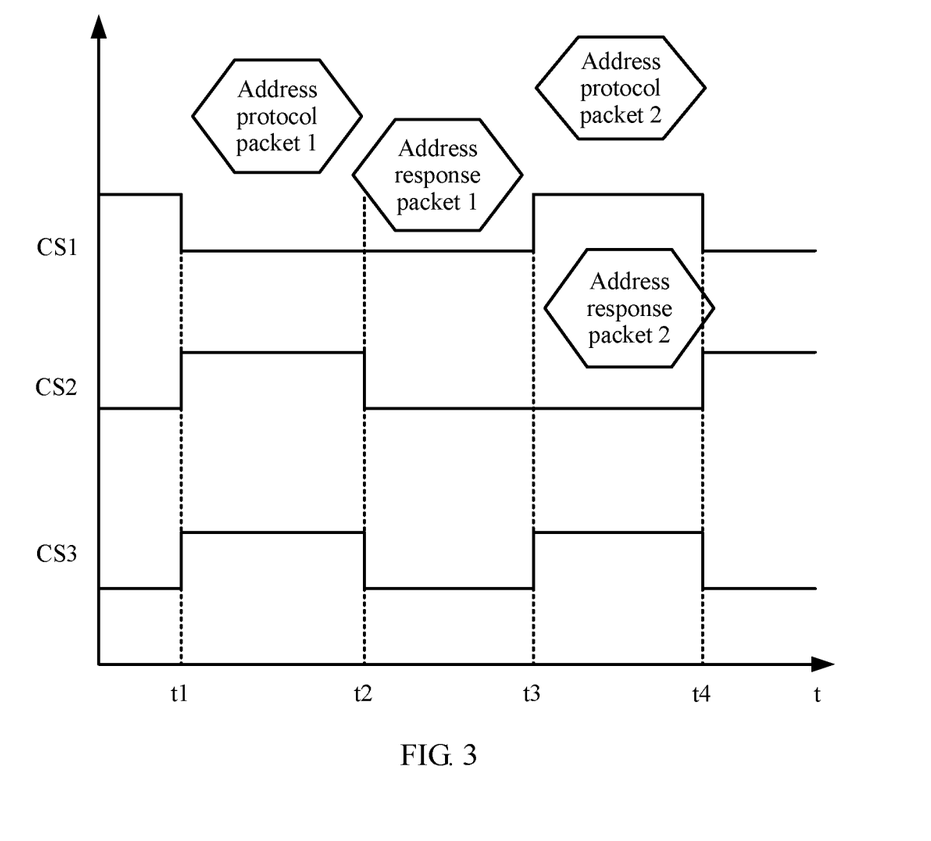
FIG. 3 is a logical sequence diagram of an example of a metering device address management method according to an embodiment of the present invention.

FIG. 3 is a logical sequence diagram of an example of a metering device address management method according to an embodiment of the present invention. The following details the logical sequence diagram shown in FIG. 3 with reference to the system shown in FIG. 1.

It should be noted that the following uses an example in which the system shown in FIG. 1 is a meter reading system for description. The following meters 11 to 16 and the metering devices 11 to 16 shown in FIG. 1 are in a one-to-one correspondence.

As shown in FIG. 3, a collection terminal 21 broadcasts an address protocol packet 1 and an address protocol packet 2 respectively at a moment t1 and a moment t3. The address protocol packet 1 is used to set a physical address of the meter 11, and the address protocol packet 2 is used to set a physical address of the meter 12. Specifically, an example in which a first signal is a low electrical level and a second signal is a high electrical level is used.

During a time interval between the moment t1 and a moment t2, a signal input to the meter 11, that is, a CS1, is a low electrical level, and signals input to the meter 12 and the meter 13, that is, a CS2 and a CS3, are high electrical levels. Therefore, during the time interval between the moment t1 and the moment t2, the meter 11 can respond to the address protocol packet 1, but the meter 12 and the meter 13 cannot respond to the address protocol packet 1. In this way, during the time interval between the moment t1 and the moment t2, the meter 11 can change, according to the address protocol packet 1, the physical address of the meter 11 to a physical address included in the address protocol packet 1. After setting the physical address of the meter 11 according to the address protocol packet 1, the meter 11 may send an address response packet 1 to the collection terminal 21, where the address response packet 1 may be an ACK message.

During a time interval between the moment t3 and a moment t4, a signal input to the meter 12, that is, the CS2, is a low electrical level, and signals input to the meter 11 and the meter 13, that is, the CS1 and the CS3, are high electrical levels. Therefore, during the time interval between the moment t3 and the moment t4, the meter 12 can respond to the address protocol packet 2, but the meter 11 and the meter 13 cannot respond to the address protocol packet 2. In this way, during the time interval between the moment t3 and the moment t4, the meter 12 can change, according to the address protocol packet 2, the physical address of the meter 12 to a physical address in the address protocol packet 2. After setting the physical address of the meter 12 according to the address protocol packet 2, the meter 12 may send an address response packet 2 to the collection terminal 21, where the address response packet 2 may also be an ACK message.

It should be understood that in this embodiment, alternatively, the address protocol packet may be a packet used to query a physical address of a meter. Correspondingly, the address response packet 1 and the address response packet 2 in FIG. 3 may include physical addresses of corresponding meters. In other words, if the address protocol packet has a function of querying an address, a corresponding meter responds to the address protocol packet when receiving the address protocol packet. That is, the meter reports a physical address of the meter to the collection terminal by using the address response packet.

It should be understood that in this embodiment of the present invention, the collection terminal may first query one by one initial physical addresses of meters connected to the collection terminal, where the initial physical addresses may be factory physical addresses of these meters. A physical address is configured for a meter only when an initial physical address of the meter conflicts with physical addresses of remaining meters connected to the collection terminal. Otherwise, the initial physical address of the meter may be directly stored. Then, when the collection terminal communicates with the meter, the initial physical address is used to identify the meter. Certainly, when meter addresses do not conflict, a physical address may still be configured for a meter. In addition, the collection terminal may not query but directly set one by one physical addresses of the meters connected to the collection terminal. This is not limited in the present invention.

Optionally, before step 102, the method may further include: The collection terminal receives a third signal sent by a target meter, where the third signal indicates that the collection terminal is connected to the target meter.

Specifically, the collection terminal may determine, according to an OL, whether the collection terminal is connected to a meter. For example, if the collection terminal is not connected to the meter, the OL is a high electrical level. Therefore, if the OL changes to a low electrical level, that is, the third signal, it indicates that the collection terminal is connected to the meter, that is, a new meter is installed. In this case, the collection terminal may determine the installed new meter as the target meter, and further set a physical address of the target meter.

Figure 4:
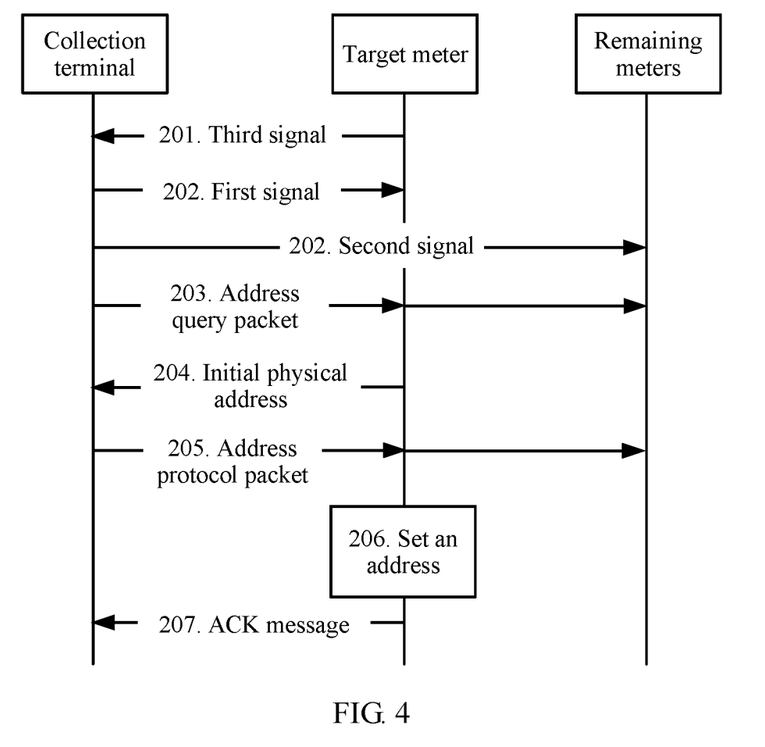
FIG. 4 is a schematic flowchart of a metering device address management method according to another embodiment of the present invention.

The following details the metering device address management method according to this embodiment of the present invention with reference to FIG. 4.

201. A target meter sends a third signal to a collection terminal.

The third signal is used to indicate that the target meter is connected to the collection terminal. That is, when receiving the third signal sent by the target meter, the collection terminal may determine that the target meter accesses a network of the collection terminal.

202. The collection terminal sends a first signal to the target meter, and sends a second signal to remaining meters connected to the collection terminal.

For a specific operation of step 202, reference may be made to the description of the step 101. For brevity, details are not described herein again.

203. The collection terminal broadcasts an address query packet.

That is, if a new meter is installed, the collection terminal may first query a factory physical address of the installed new meter, and then determine, according to the factory physical address, whether to reset the physical address of the meter.

It should be understood that the address query packet may be a packet used to query a physical address of a meter.

204. The target meter sends an initial physical address to the collection terminal.

The target meter may respond, according to the first signal sent by the collection terminal in step 202, to the address query packet sent by the collection terminal, and send the initial physical address of the target meter. The initial physical address herein may be a factory physical address of the target meter. According to the third signal sent by the collection terminal, the remaining meters may directly discard the address query packet, and do not respond to the address query packet.

205. The collection terminal broadcasts an address protocol packet.

If detecting that the factory physical address of the target meter conflicts with a physical address of another meter, the collection terminal may reset the physical address of the target meter by broadcasting the address protocol packet, so as to resolve an address conflict problem.

It should be understood that the address protocol packet may be a packet used to set a physical address of a meter.

206. The target meter sets a physical address of the target meter according to the address protocol packet.

After receiving the address protocol packet, the target meter may respond to the address protocol packet according to the first signal received by the target meter. That is, the target meter sets the physical address of the target meter to a target physical address according to the target physical address included in the address protocol packet. In this case, although the remaining meters can also receive the address protocol packet, the remaining meters do not respond to the address protocol packet and directly discard the packet because the remaining meters receive the second signal sent by the collection terminal. In this way, the address of the target meter can be set by the collection terminal.

207. The target meter sends an ACK message to the collection terminal.

The target meter notifies the collection terminal that the target meter has set the physical address of the target meter to the target physical address according to an instruction of the collection terminal.

In this embodiment, the collection terminal sends the first signal to the target metering device, and sends the second signal to the remaining metering devices that are other than the target metering device and that are connected to the collection terminal, so that the target metering device can respond to the address protocol packet broadcast by the collection terminal, and set the physical address of the target metering device, and the remaining metering devices connected to the collection terminal do not respond to the address protocol packet. Therefore, the collection terminal can automatically set the physical address of the metering device, so that a problem of manually configuring the physical address of the metering device is resolved.

The foregoing details the metering device address management method according to the embodiments of the present invention with reference to FIG. 2 to FIG. 4. The following describes a collection terminal according to an embodiment of the present invention with reference to FIG. 5.

Figure 5:
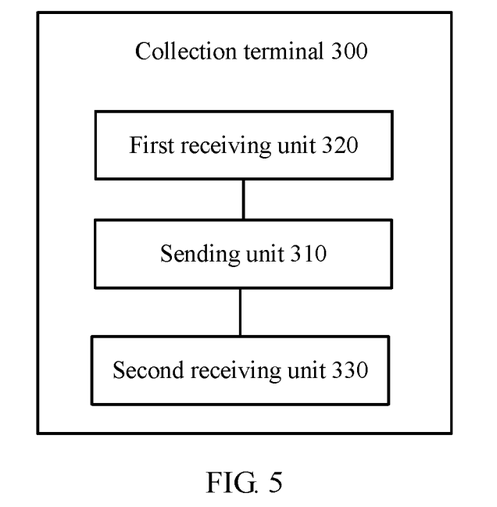
FIG. 5 is a schematic block diagram of a collection terminal according to an embodiment of the present invention.

FIG. 5 is a schematic block diagram of a collection terminal 300 according to an embodiment of the present invention. The collection terminal 300 shown in FIG. 5 mainly includes a sending unit 310.

The sending unit 310 may be configured to send a first signal to a target metering device, and send a second signal to remaining metering devices that are other than the target metering device and that are connected to the collection terminal 300.

The first signal instructs the target metering device to respond to an address protocol packet broadcast by the collection terminal, and the second signal instructs the remaining metering devices not to respond to the address protocol packet.

The sending unit 310 may be further configured to broadcast the address protocol packet.

The address protocol packet may be used to query or set a physical address of the target metering device.

The collection terminal in this embodiment of the present invention sends the first signal to the target metering device, and sends the second signal to the remaining metering devices that are other than the target metering device and that are connected to the collection terminal, so that the target metering device can respond to the address protocol packet broadcast by the collection terminal, and the remaining metering devices connected to the collection terminal do not respond to the address protocol packet. Therefore, the collection terminal can automatically query and set the physical address of the metering device, so that a problem of manually configuring the physical address of the metering device is resolved.

Optionally, the collection terminal 300 may further include a first receiving unit 320, which may be configured to receive a third signal sent by the target metering device, where the third signal indicates that the target metering device is connected to the collection terminal.

Optionally, the address protocol packet includes a target physical address, where the target physical address is corresponding to the target metering device.

Optionally, the collection terminal 300 may further include a second receiving unit 330. The second receiving unit 340 may be configured to receive an acknowledgement ACK message sent by the target metering device. The ACK message is sent by the target metering device after the target metering device sets the physical address of the target metering device to the target physical address according to the address protocol packet.

It should be understood that the collection terminal 300 herein is implemented in a form of a function unit. The term "unit" herein may refer to an application-specific integrated circuit (Application Specific Integrated Circuit, ASIC for short), an electronic circuit, a processor (for example, a shared processor, or a dedicated processor) configured to execute one or more software or hardware programs, a memory, or a combination logic circuit and/or another proper component that supports the described functions. In an optional example, a person skilled in the art should understand that the collection terminal 300 may be specifically the collection terminal in the foregoing method embodiment. The collection terminal 300 may be configured to perform all procedures and/or steps corresponding to the collection terminal in the foregoing method embodiment. To avoid repetition, details are not described herein again.

Figure 6:
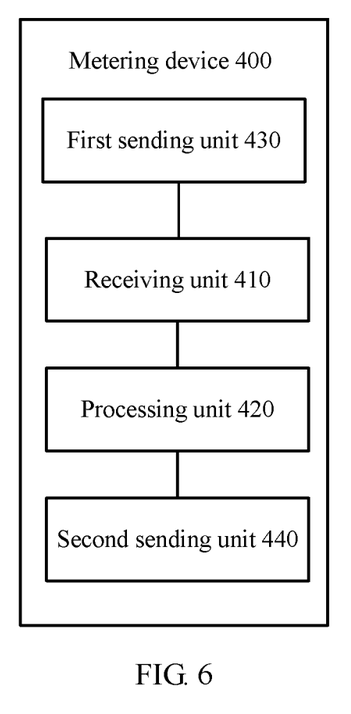
FIG. 6 is a schematic block diagram of a metering device according to an embodiment of the present invention.

FIG. 6 is a schematic block diagram of a metering device 400 according to an embodiment of the present invention. The metering device 400 shown in FIG. 6 includes a receiving unit 410 and a processing unit 420.

The receiving unit 410 may be configured to receive a first signal sent by a collection terminal.

The receiving unit 410 may be further configured to receive an address protocol packet sent by the collection terminal, where the address protocol packet is used to query or set a physical address of the metering device.

The processing unit 420 may be configured to perform response processing on the address protocol packet according to the first signal received by the receiving unit 410.

Specifically, the metering device may respond, according to the received first signal, the address protocol packet sent by the collection terminal. That is, according to content of the address protocol packet, the metering device responds to a physical address query request of the collection terminal or set the physical address of the metering device.

The metering device in this embodiment of the present invention performs, according to the first signal sent by the collection terminal, response processing on the address protocol packet broadcast by the collection terminal. Therefore, the collection terminal can automatically query and set the physical address of the metering device, so that a problem of manually configuring the physical address of the metering device is resolved.

Optionally, the metering device 400 may further include a first sending unit 430. The first sending unit 430 may be configured to send a third signal to the collection terminal, where the third signal indicates that the metering device 400 is connected to the collection terminal.

Optionally, the address protocol packet may include a target physical address. In this case, the processing unit 420 is specifically configured to set the physical address of the metering device to the target physical address according to the first signal received by the receiving unit 410.

Optionally, the metering device 400 may further include a second sending unit 440. The second sending unit 440 may be configured to send an acknowledgement ACK message to the collection terminal.

It should be understood that the metering device 400 herein is implemented in a form of a function unit. The term "unit" herein may refer to an ASIC, an electronic circuit, a processor (for example, a shared processor, or a dedicated processor) configured to execute one or more software or hardware programs, a memory, or a combination logic circuit and/or another proper component that supports the described functions. In an optional example, a person skilled in the art should understand that the metering device 400 may be specifically the target meter in the foregoing method embodiment. The metering device 400 may be configured to perform all procedures and/or steps corresponding to the target meter in the foregoing method embodiment. To avoid repetition, details are not described herein again.

Figure 7:
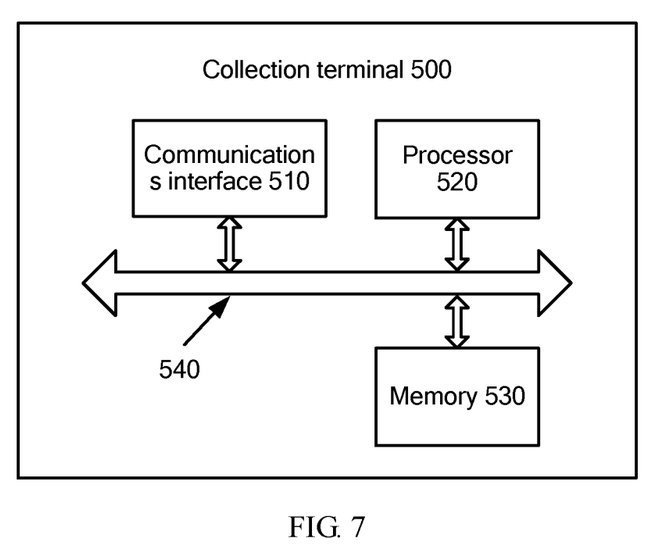
FIG. 7 is a schematic block diagram of a collection terminal according to another embodiment of the present invention.

FIG. 7 shows a collection terminal 500 provided in an embodiment of the present invention. The collection terminal 500 may include a communications interface 510, a processor 520, a memory 530, and a bus system 540.

The communications interface 510, the processor 520, and the memory 530 are connected by using the bus system 540. The bus 540 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one bold line is used in FIG. 7 to represent the bus, but it does not indicate that there is only one bus or one type of bus.

The memory 530 may include a volatile memory (volatile memory), such as a random access memory (random-access memory, RAM for short); the memory 530 may include a nonvolatile memory (non-volatile memory), for example, a flash memory (flash memory), a hard disk drive (hard disk drive, HDD for short), or a solid-state drive (solid-state drive, SSD for short); or the memory 530 may include a combination of the foregoing memories. The memory 530 may store a physical address, collected data, and the like of a metering device connected to the collection terminal.

The processor 520 may be a central processing unit (central processing unit, CPU for short), a network processor (network processor, NP for short), or a combination of the CPU and the NP. The processor 520 may further include a hardware chip. The hardware chip may be an ASIC, a programmable logic device (programmable logic device, PLD for short), or a combination of the ASIC and the PLD. The PLD may be one or any combination of a complex programmable logical device (complex programmable logic device, CPLD for short), a field programmable gate array (field-programmable gate array, FPGA for short), and a generic array logic (generic array logic, GAL for short).

Optionally, the memory 530 may be further configured to store instructions. The processor 520 is configured to execute the instructions stored in the memory 530, so as to perform all steps and/or procedures corresponding to the collection terminal in the foregoing method embodiment. For brevity, details are not described herein again.

The processor 520 sends a first signal to a target metering device by using the communications interface 510, and sends a second signal to remaining metering devices that are other than the target metering device and that are connected to the collection terminal 500.

The first signal instructs the target metering device to respond to an address protocol packet sent by the collection terminal, and the second signal instructs the remaining metering devices not to respond to the address protocol packet.

The processor 520 further broadcasts the address protocol packet by using the communications interface 510. The address protocol packet is used to query or set a physical address of the target metering device.

It should be understood that the communications interface 510 uses, but not only can use, a transceiving apparatus such as a transceiver, so as to implement communication between the collection terminal 500 and another device or communications network.

The collection terminal in this embodiment of the present invention sends the first signal to the target metering device, and sends the second signal to the remaining metering devices that are other than the target metering device and that are connected to the collection terminal, so that the target metering device can respond to the address protocol packet broadcast by the collection terminal, and the remaining metering devices connected to the collection terminal do not respond to the address protocol packet. Therefore, the collection terminal can automatically query and set the physical address of the metering device, so that a problem of manually configuring the physical address of the metering device is resolved.

Optionally, the processor 520 further receives, by using the communications interface 510, a third signal sent by the target metering device, where the third signal is used to indicate that the target metering device is connected to the collection terminal.

Optionally, the address protocol packet includes a target physical address, where the target physical address is corresponding to the target metering device.

Optionally, the processor 520 further receives, by using the communications interface 510, an ACK message sent by the target metering device, where the ACK message is sent by the target metering device after the target metering device sets the physical address of the target metering device to the target physical address according to the address protocol packet.

It should be understood that the collection terminal 500 may be specifically the collection terminal 300 in the foregoing embodiment, and may be configured to perform all steps and/or procedures corresponding to the collection terminal in the foregoing method embodiment.

Figure 8:
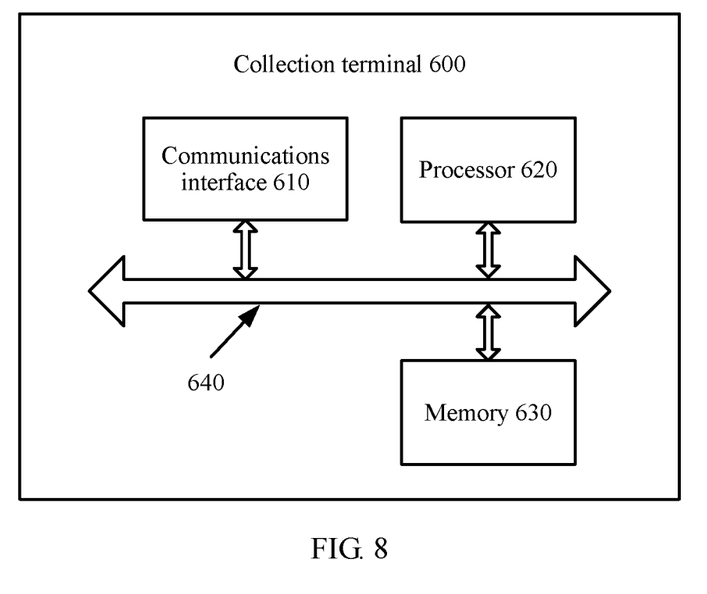
FIG. 8 is a schematic block diagram of a metering device according to another embodiment of the present invention.

FIG. 8 shows a metering device 600 provided in an embodiment of the present invention. The metering device 600 may include a communications interface 610, a processor 620, a memory 630, and a bus system 640.

The communications interface 610, the processor 620, and the memory 630 are connected by using the bus system 640. The bus 640 may be a peripheral component interconnect PCI bus, an extended industry standard architecture EISA bus, or the like. The bus may be classified into an address bus, a data bus, a control bus, and the like. For ease of representation, only one bold line is used in FIG. 8 to represent the bus, but it does not indicate that there is only one bus or one type of bus.

The memory 630 may include a volatile memory, for example, a random access memory RAM; the memory 630 may include a nonvolatile memory, for example, a flash memory, a hard disk drive HDD, or a solid-state drive SSD; or the memory 630 may include a combination of the foregoing memories. The memory 630 may be configured to store historical electricity consumption data of a user, and the like.

The processor 620 may be a central processing unit CPU, a network processor (NP), or a combination of the CPU and the NP. The processor 620 may further include a hardware chip. The hardware chip may be an ASIC, a programmable logic device PLD, or a combination of the ASIC and the PLD. The PLD may be one or any combination of a complex programmable logical device CPLD, a field programmable gate array FPGA, and a generic array logic GAL.

Optionally, the memory 630 is configured to store instructions. The processor 620 is configured to execute the instructions stored in the memory 630, so as to perform all steps and/or procedures corresponding to the target meter in the foregoing method embodiment. For brevity, details are not described herein again.

The processor 620 receives, by using the communications interface 610, a first signal sent by a collection terminal.

The processor 620 further receives, by using the communications interface 610, an address protocol packet sent by the collection terminal, and responds to the address protocol packet according to the first signal, where the address protocol packet is used to query or set a physical address of a metering device.

Specifically, the metering device performs response processing on the address protocol packet according to the received first signal. For example, the metering device herein may be the meter 11 in FIG. 1. Referring to the foregoing descriptions in FIG. 3, when the first signal received by the meter 11 is a low electrical level signal, the meter 11 may respond to the address protocol packet 1. That is, according to the address protocol packet 1, the meter 11 sets the physical address of the meter 11, or reports the physical address of the meter 11 to the collection terminal.

It should be understood that the communications interface 610 uses, but not only can use a transceiving apparatus such as a transceiver, so as to implement communication between the metering device 600 and another device or communications network.

The metering device in this embodiment of the present invention performs, according to the first signal sent by the collection terminal, response processing on the address protocol packet broadcast by the collection terminal. That is, the metering device sets the physical address of the metering device or reports the physical address of the metering device to the collection terminal. Therefore, the collection terminal can automatically query and set the physical address of the metering device, so that a problem of manually configuring the physical address of the metering device is resolved.

Optionally, the processor 620 further sends a third signal to the collection terminal by using the communications interface 610, where the third signal indicates that the metering device is connected to the collection terminal.

Optionally, the address protocol packet includes a target physical address. The processor 620 is specifically configured to set the physical address of the metering device to the target physical address according to the first signal.

Optionally, the processor 620 further sends an ACK message to the collection terminal by using the communications interface 610.

It should be understood that the metering device 600 may be specifically the metering device 400 in the foregoing embodiment, and may be configured to perform all steps and/or procedures corresponding to the target meter in the foregoing method embodiment.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, and indirect couplings or communication connections between the apparatuses or units may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, function units in the embodiments of the present invention may be integrated into one processing unit, or each of the units may exist alone physically, or at least two units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A metering device address management method, wherein the method comprises:
    sending, by a collection terminal, a first signal to a target metering device;
    sending, by the collection terminal, a second signal to remaining metering devices that are other than the target metering device and that are connected to the collection terminal, wherein:
       only the target meter receives the first signal;
       the first signal is used to instruct the target metering device to respond to an address protocol packet sent by the collection terminal; and
       the second signal is used to instruct the remaining metering devices not to respond to the address protocol packet; and
    broadcasting, by the collection terminal, the address protocol packet, wherein the address protocol packet is used to query or set a physical address of the target metering device.

2. The method according to claim 1, wherein before the sending, by a collection terminal, a first signal to a target metering device, the method further comprises:
    receiving, by the collection terminal, a third signal sent by the target metering device, wherein the third signal indicates that the target metering device is connected to the collection terminal.

3. The method according to claim 1, wherein the address protocol packet comprises a target physical address, and the target physical address is corresponding to the target metering device.

4. The method according to claim 3, wherein the method further comprises:
  receiving, by the collection terminal, an acknowledgement (ACK) message sent by the target metering device, wherein the ACK message is sent by the target metering device after the target metering device sets the physical address of the target metering device to the target physical address according to the address protocol packet.

5. A collector terminal, comprising:
  a memory storing executable instructions and a processor configured to execute the executable instructions to:
  send a first signal to a target metering device, wherein:
    the first signal is used to instruct the target metering device to respond to an address protocol packet sent by the collection terminal; and
    only the target meter receives the first signal;
  send a second signal to remaining metering devices that are other than the target metering device and that are connected to the collection terminal, wherein the second signal is used to instruct the remaining metering devices not to respond to the address protocol packet; and
  broadcast the address protocol packet, wherein the address protocol packet is used to query or set a physical address of the target metering device.

6. The collection terminal according to claim 5, wherein the processor is further configured to:
  receive a third signal sent by the target metering device, wherein the third signal indicates that the target metering device is connected to the collection terminal.

7. The collection terminal according to claim 5, wherein the address protocol packet comprises a target physical address, and the target physical address is corresponding to the target metering device.

8. The collection terminal according to claim 5, wherein the processor is further configured to:
  receive an acknowledgement (ACK) message sent by the target metering device, where the ACK message is sent by the target metering device after the target metering device sets the physical address of the target metering device to the target physical address.

* * * * *